Figure 1:
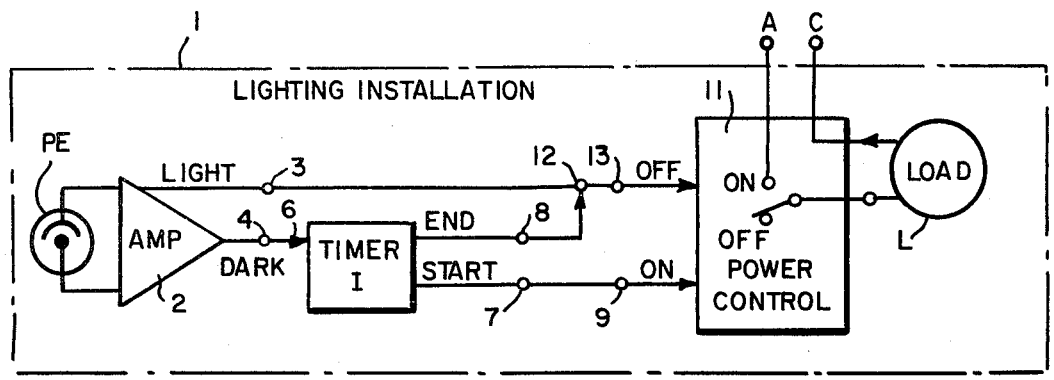

United States Patent [19]

Grady

[11] 4,362,970

[45] Dec. 7, 1982

[54] ENERGY CONSERVING ELECTRICAL POWER CONTROL CIRCUIT

[76] Inventor: John K. Grady, 277 Baker Ave., Concord, Mass. 01742

[21] Appl. No.: 184,991

[22] Filed: Sep. 8, 1980

[51] Int. Cl.$^3$ ............................................. H05B 37/02
[52] U.S. Cl. .................................... 315/159; 307/117; 307/141.4; 250/214 AL; 315/360
[58] Field of Search ............... 315/152, 156, 159, 360, 315/155, 226; 307/117, 141, 141.4; 250/214 AL; 328/2; 361/175

[56] References Cited

U.S. PATENT DOCUMENTS

| | | | |
|---|---|---|---|
| 3,261,992 | 7/1966 | Coe | 307/117 |
| 4,180,087 | 12/1979 | Meisner et al. | 250/214 AL |
| 4,198,563 | 4/1980 | Elssner | 315/360 X |
| 4,209,728 | 6/1980 | Membreno | 315/159 |

Primary Examiner—Eugene R. La Roche
Attorney, Agent, or Firm—James H. Grover

[57] ABSTRACT

An energy conserving circuit for controlling supply of electrical power to various loads such as a street lamp or a hot water heater comprises a photoelectric device for starting a timer when a change from daylight to dark is sensed at sundown, and a load power control responsive to the timer to switch between power-off and power-on states. With a street lamp the timer and power control means are connected to switch the power control means to power-on state at the beginning of the delay period at sundown and later, well before sunrise, to switch to power-off state. In the case of a household hot water heater the switching of the power control to power-on state is delayed until the peak demand hours have ended after sundown. The photoelectric device will normally cause the power control to switch to power-off state at sunrise. But a second timer may be added which is responsive to the photoelectric device to start a second timing period ending after normal sunrise so that switching to power-off will occur if the photoelectric device does not or cannot respond to sunrise.

1 Claim, 3 Drawing Figures

ENERGY CONSERVING ELECTRICAL POWER CONTROL CIRCUIT

BACKGROUND OF THE INVENTION

Electrical energy can be conserved by selecting and limiting the hours during which it is consumed. Street lamps, for example, are commonly turned on at sunset and off at sunrise by a photoelectric cell. More widespread programming of household hot water heaters during hours off the peak of consumption would allow electrical utilities to operate more efficiently. On the one hand, however, photoelectrically controlled street lamps burn until sunrise, whereas at least half of them on a given stretch of road might be safely turned off at two o'clock in the morning. On the other hand the off-peak electrical power hours do not start until late in the evening, well after sunset and continue until sunrise. Supply of power to the heater might be limited to certain hours by a clock, but clocks are known to drift in accuracy over periods of months, and may be radically detimed by power outages.

It is therefore one object of the present invention to provide an energy conserving power control circuit which eliminates the errors of asynchronous clock operation. A further object is to eliminate malfunction of a photoelectric device by accidental or intentional covering of its photosensitive surface. A still further object is to program use of electrical power in the most economical hours.

STATEMENT OF INVENTION

According to the invention a power control circuit comprises a photoelectric device for sensing changes between light and dark; a timer coupled to the device including means timing a delay period starting when the device senses a light change; and power control means having a power output and actuated by the timer to switch between power-off and power-on states at the output. The timer and power control means may be connected to switch the power control means to power-on state either at the beginning or at the end of the delay period. To provide for covering of the photoelectric device the circuit may include a second timer responsive to a change in the photoelectric device to start timing a second delay period longer than the first said delay period, the second timer being connected to the power control means to switch the power control means to power-off state at the end of the second delay period.

DRAWING

Figure 2:
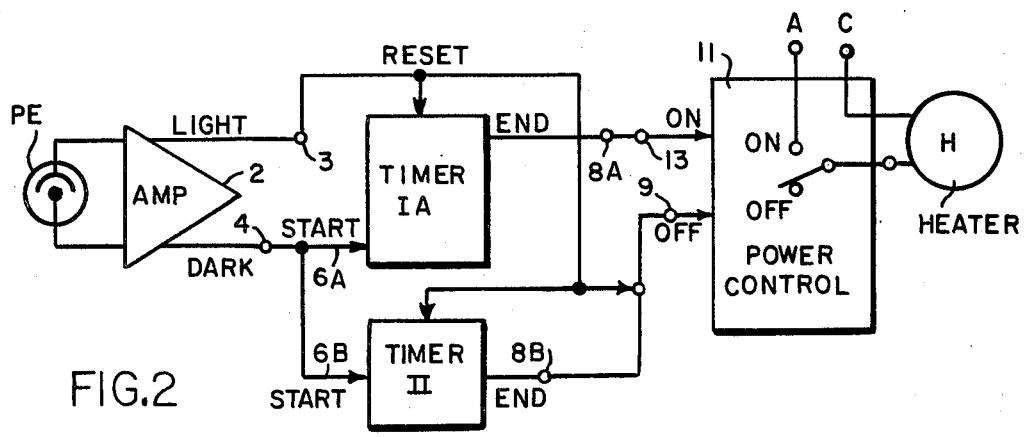
Figure 3:
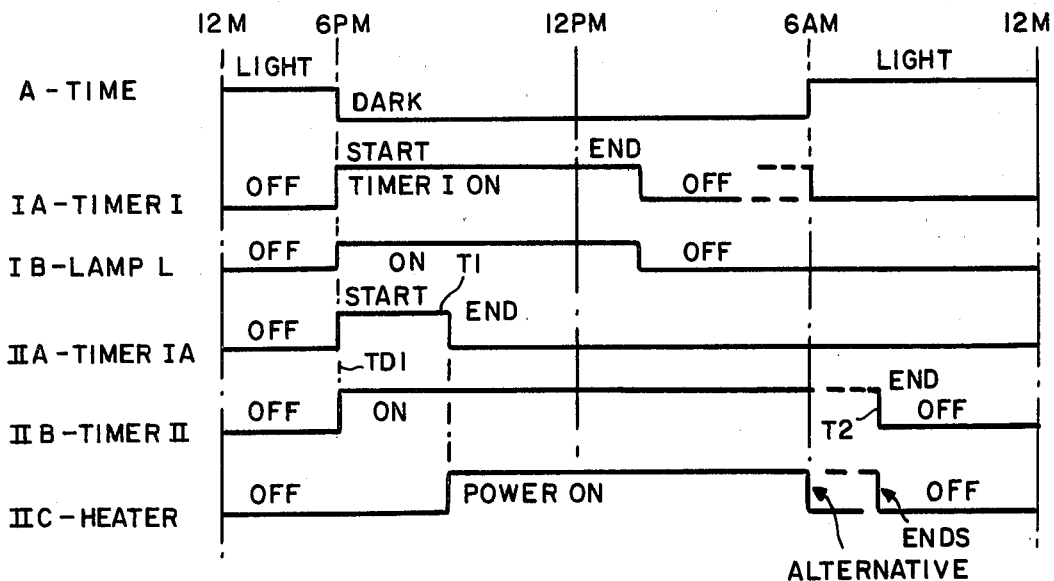

FIGS. 1 and 2 are circuit diagrams according to two different forms of the invention; and FIG. 3 is a graph of power state versus time of the circuits of FIGS. 1 and 2.

DESCRIPTION

One form of the present energy saving circuit comprises a photoelectric cell PE typically installed on a lighting fixture 1 along a highway, the cell viewing the sky and changing its response radically at sunrise and sunset. An operational amplifier 2 responds to transitions of the photocell to produce a logic high signal at its LIGHT output 3 at sunrise, and a logic low signal at its DARK output 4 at sunset. At the end of a day the DARK signal is applied by a connection 6 to a first timer I which then begins a time delay period. At the beginning of the time delay period the timer produces a logic signal at its START output 7 which, when applied to the ON input 9 of a power controller 11 to which the output 7 is connected, causes the power control 11 to switch from a power-off state to a power-on state. In the power-on state the control 11 connects alternating electric current from line terminals AC to the load L, namely a street lamp, turning it on when first needed.

According to the invention, and as shown in FIG. 3. the first timer I ends its time delay period well before sunrise, e.g. two o'clock AM, and applies at its END output 12 and the OFF input 13 of the power control 11 a logic signal which switches the power control to power-off state, disconnecting power from the lamp load L. Energy is thus conserved in the early morning hours when street lighting is needed less than earlier, although only part, say 50% of the lighting is provided with the present control circuit. Such operation is shown in FIG. 3 wherein curve A shows a typical 24 hour daily natural light change from daylight to dark at a 6:00 PM sunset and dark to light at a 6:00 AM sunrise. At 6:00 PM the DARK output 4 of the photocell amplifier 2 is activated applying a start signal to the timer I (curve IA) which applies an ON signal to the power controller 11 (curve IB) so as to turn the lamp load L on. At 6:00 AM sunrise the photocell activates the LIGHT output 3 of the amplifier 2 supplying a signal to the OFF terminal 13 of the power controller 11, switching off power to the lamp L. Preferably, however, the timer I has been set for a time delay which ends shortly after midnight thus conserving energy until daylight (curve IA). It should be noted that the timing circuit of FIG. 1 for a street lamp does not depend on clock accuracy since it is cycled each day by the sun.

Similarly the circuit of FIG. 2 for programming energization of a hot water heater H is independent of clock accuracy over a short or long period. As in FIG. 1 a photocell PE senses the changes of sky light at sunrise and sunset causing its amplifier 2 to produce LIGHT and DARK signals at its outputs 3 and 4 respectively. At sunset the DARK signal is applied to the start inputs 6A and 6B of first and second timers IA and II having different time delays before a delayed END signal is produced at their END outputs 8A and 8B respectively connected to the ON input 13 and OFF input 9 of a power control 11 like that of FIG. 1 for a hot water heater H.

As shown in FIG. 3, curves IIA to IIC, timer IA includes means timing a delay, TD1 between a 6:00 PM sunset and an early off-peak hour T1 8:00 PM for example. At time T1 the timer IA END (of time delay) output 8A is applied to the ON input 13 of the power control 11 switching it to power-on state and supplying power from the power terminals A and C to the heater H. The control 11 is switched to power-off state by the photoelectric cell amplifier LIGHT output 3 at 6:00 AM sunrise for example, or by the end T2 of the time delay period of timer II. If the photocell PE is accidentally or intentionally covered it cannot terminate the heating at sunrise, but shortly thereafter the end of time T2, say an hour or two after mean sunrise time, fourteen hours after the start of timing, the heater will be shut off by the control 11 (curve IIC).

At 6:00 AM sunrise the photocell amplifier LIGHT output 3 will apply reset signals to the timers IA and II returning them to non-timing condition if they have not already done so by timing out at the ends of their respective time delay periods. The circuit of FIG. 2 is thus particularly independent of accurate clock timing since it resets itself for each daily timing cycle initiation by sunrise. The circuit of FIG. 2 is thus free of the objection applicable to a clock controlled heater, that the clock might drift in accuracy or fail altogether leaving the heater on in peak consumption hours.

It should be understood that the present disclosure is for the purpose of illustration only and that this invention includes all modifications and equivalents which fall within the scope of the appended claims.

I claim:

1. A power control circuit comprising:
    a photoelectric device for sensing changes between light and dark;
    a timer coupled to the device including means timing a delay period starting when the device senses a light change;
    power control means having a power output and actuated by the timer to switch between power-off and power-on states at the output,
    wherein the timer and power control means are connected to switch the power control means to power-on state at the end of the delay period, and
    including a second timer responsive to a change in the photoelectric device to start timing a second delay period longer than the first said delay period, the second timer being connected to the power control means to switch the power control means to power-off state at the end of the second delay period.

* * * * *